UNITED STATES PATENT OFFICE.

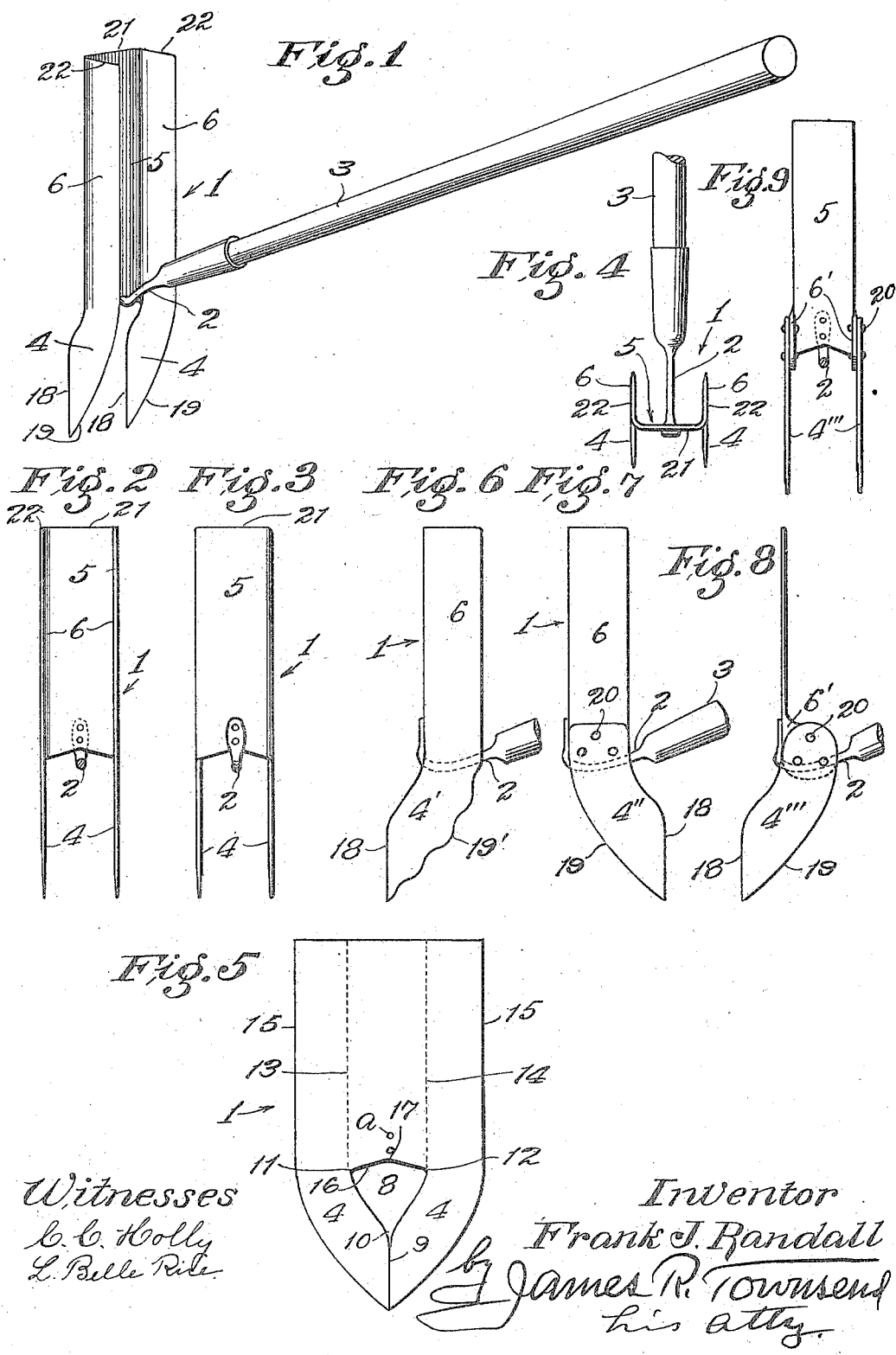

FRANK J. RANDALL, OF LOS ANGELES, CALIFORNIA.

LAWN-EDGER.

951,547. Specification of Letters Patent. Patented Mar. 8, 1910.

Application filed June 24, 1909. Serial No. 504,194.

*To all whom it may concern:*

Be it known that I, FRANK J. RANDALL, a citizen of the United States, residing at Los Angeles, in the county of Los Angeles and State of California, have invented a new and useful Lawn-Edger, of which the following is a specification.

This invention relates to an implement for trimming the edges of lawns along walks and borders of yards.

An object of this invention is to provide means to facilitate trimming the edges of lawns.

Another object is to provide a cheap and simple combination tool with which to accomplish this work.

The accompanying drawings illustrate the invention.

Figure 1 is a perspective view of a lawn-edger embodying the invention in one of its forms. Fig. 2 is a top view of the same, the handle being cut away at the shank. Fig. 3 is a bottom view of the implement shown in Figs. 1 and 2. Fig. 4 is an elevation of the end of the tool, the handle being broken away. Fig. 5 is a view of a blank from which the head of the implement shown in Figs. 1 to 4 may be bent. Fig. 6 is a side elevation of the implement with wavy edges on its scoring blades. Fig. 7 is a side elevation of another form of the implement in which the scoring blades are riveted to the heels of the side walls. Fig. 8 is a side elevation of another form in which the channeler is shown practically without side walls and the scoring blades are fastened to the channeler by side lugs corresponding to the heel portions of the side walls shown in the other views. Fig. 9 is a view from the right of Fig. 8.

The head 1 of the implement may be fastened by a shank 2 to a handle 3 and may be provided on one side of the shank with two parallel scoring blades 4, and on the other side of the shank with a channeler which may comprise an edged flat bottom member or channeling blade 5 and two side wall members 6. The side walls and scoring blades extend in planes at right angles to the plane of the channeling blade. The inner ends of the scoring blades 4 are connected with the heels of the side walls. In some instances, as in Fig. 1, the side walls and the blades are formed of a single piece, and in such form, the entire head of the implement may be bent up from a blank of sheet metal such as shown in Fig. 5 in which a flat sheet is first provided, the same being rectangular at one end and being narrowed to a point at the other end; the narrowed portion being stamped with a centrally arranged hole 8 from which a slit 9 extends to the tip of the pointed end, thus dividing the pointed end of the sheet into two arms which are to form the scoring blades 4. Said hole 8 may be triangular or nearly so, as shown in Fig. 5, the slit extending from one angle 10 of the hole to the tip of the sheet and the other principal angles 11 and 12 lying in a line that extends at right angles to the slit 9. From the angles 11 and 12 the sheet may be bent in lines 13 and 14 parallel with the side edges 15 of the sheet, thus forming the two side walls and the bottom of the channeler. The edge 16 of the hole 8 opposite the slit 9 may be bent away from the slit to a central angle or corner 17 to receive the shank of the handle 2, and perforations *a* may be provided for rivets to fasten the shanks to the head. In this manner of construction the scoring blades are provided with downwardly-extending edges 18, that project below the level of the bottom of the channeler so as to provide long cutting edges 19 extending from the tops of the side walls to the points of the scoring blades. Said cutting edges 19 are preferably curved as shown and the curvature may be backward or forward, as desired. The edges 18 may or may not be sharpened.

In the form shown in Fig. 6 the blades 4' have wavy edges 19'. In the form shown in Figs. 7 and 8 the blades 4'' and 4''' are riveted to the heels of the side walls by rivets 20. In the form shown in Figs. 8 and 9 the main bodies of the side walls are cut away, leaving only the heels 6' from which the scoring-blades project. It is understood that said scoring-blades may be either integral with the side walls or riveted thereto as desired. The floor or bottom member 5 of the channeler is provided at the end opposite the handle with a sharp cutting edge 21, and the corresponding ends of the side walls where such walls are present may also be sharp-edged as at 22.

In practical use, to cut the lawn alongside a cement-walk, one of the scoring-blades will be inserted between the sod and the walk, and the other blade will be inserted into the sod alongside the walk. Then the implement will be drawn alongside the walk, thus making two incisions, one along the edge of the walk and the other at a determined distance therefrom. When the implement has thus been drawn along the edge of the walk, thereby scoring the sod, the implement will be reversed and the edges 22 will be brought into the scores and the edge 21 will be made to cut along underneath the sod between the scores, thus cutting out a strip of sod between the scores. The head 1 may be of considerable length,—say about five inches more or less, so that the strips of sod may be easily hoed out to the required depth, leaving a straight clean-cut channel along the edge of the walk. The scoring edges may be straight or wavy as deemed most desirable, and they may be bent toward or from either side of the head.

In the form shown in Fig. 7 the scoring will be performed by pushing the implement forward, while in the forms shown in Figs. 1, 6 and 8 the implement will be drawn along to do the scoring.

It is thus seen that I have provided an implement comprising a plate having at one end, a cutting edge, and at the other end thin-sheet-like prongs projecting from one side of the plate at the edges thereof; that the sides of the prongs are parallel with each other and normal to said cutting edge to form scoring blades and the edges of the prongs extend oblique to the plane of the plate, and that the handle is fixed to the head and extends nearly normal to the plane of the plate and is inclined toward the cutting edge thereof and that the edges of the prongs may be curved and that the curvature of said curved edges may be of a wavy nature and that the prongs may be struck from or riveted to the main body of the head.

I claim:—

1. A lawn edger comprising a plate having at one end a cutting edge, and at the other end thin-sheet-like prongs projecting from one side of the plate at the edges thereof; the sides of said prongs being parallel with each other and normal to said cutting edge to form scoring blades, and the edges of the prongs extending oblique to the plane of the plate; and a handle fixed to the head extending nearly normal to the plane of the plate and inclined toward the cutting edge thereof.

2. A lawn edger comprising a plate having at one end a cutting edge, and at the other end thin sheet-like prongs projecting from one side of the plate at the edges thereof; the sides of said prongs being parallel with each other and normal to said cutting edge, to form scoring blades and the edges of the prongs extending oblique to the plane of the plate; and a handle fixed to the head extending nearly normal to the plane of the plate and inclined toward the cutting edge thereof, the edges of the prongs being curved.

In testimony whereof, I have hereunto set my hand at Los Angeles, California, this 18th day of June, 1909.

FRANK J. RANDALL.

In presence of—
  JAMES R. TOWNSEND,
  L. BELLE RICE.